United States Patent [19]

Morehead

[11] Patent Number: 4,821,453

[45] Date of Patent: Apr. 18, 1989

[54] PLANT PROTECTING AND GROWTH ENHANCING DEVICE

[76] Inventor: James B. Morehead, 485 Sonoma Mountain Rd., Petaluma, Calif. 94952

[21] Appl. No.: 15,789

[22] Filed: Feb. 17, 1987

[51] Int. Cl.⁴ ............................................. A01G 13/00
[52] U.S. Cl. ............................................. 47/2; 47/26; 47/28 R; 222/475
[58] Field of Search .................... 47/2, 29, 20, 21, 26, 47/27, 28.1, 30, 28, 23, 19, 24; 222/475

[56] References Cited

U.S. PATENT DOCUMENTS

| | | | |
|---|---|---|---|
| 303,543 | 8/1884 | Prentiss | 47/28 |
| 2,443,440 | 6/1948 | Alvarez | 47/28.1 |
| 3,206,892 | 9/1965 | Telkes et al. | 47/29 |
| 3,939,607 | 2/1976 | Spector | 47/29 |
| 4,012,867 | 3/1977 | Lainchbury et al. | 47/29 |
| 4,087,938 | 5/1978 | Koch | 47/48.5 |
| 4,137,667 | 2/1979 | Wallace et al. | 47/29 |
| 4,267,665 | 5/1981 | Wallace et al. | 47/29 |

FOREIGN PATENT DOCUMENTS 68643 10/1892 Fed. Rep. of Germany ........ 47/28

*Primary Examiner*—Robert A. Hafer
*Assistant Examiner*—Sam Rimell
*Attorney, Agent, or Firm*—George W. Wasson

[57] ABSTRACT

A plant protecting and growth enhancing device is disclosed for use in providing an environment immediately surrounding a plant to protect the plant from atmospheric changes during its early life of growing. The plant protector is a rigid, conical, transparent device that is adapted to contain a fluid that may absorb thermal energy from an outside source and may release that absorbed thermal energy at another time. The device is adapted to be placed over a seedling plant as the plant is planted and is capable of protecting the plant from frost or other possible detrimental conditions until the plant has a chance to become established. The fluid within the device may be drained onto the plant when the device is no longer needed.

6 Claims, 1 Drawing Sheet

U.S. Patent      Apr. 18, 1989      4,821,453
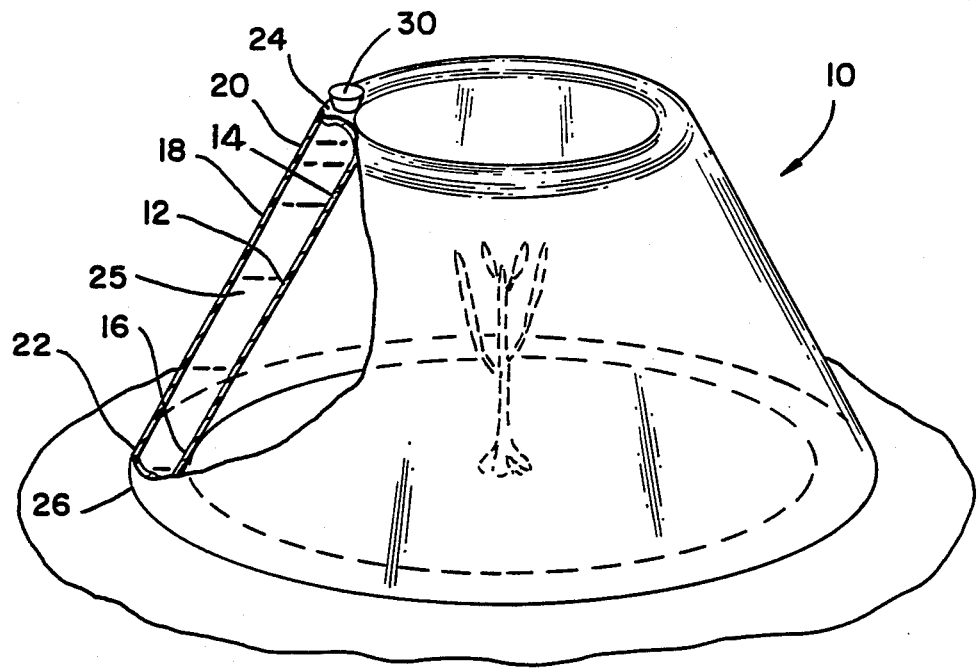
FIG _ 1
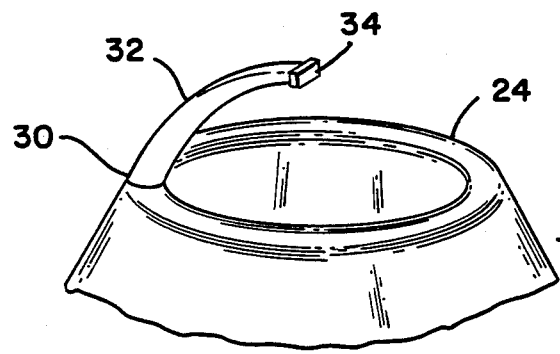
FIG _ 2
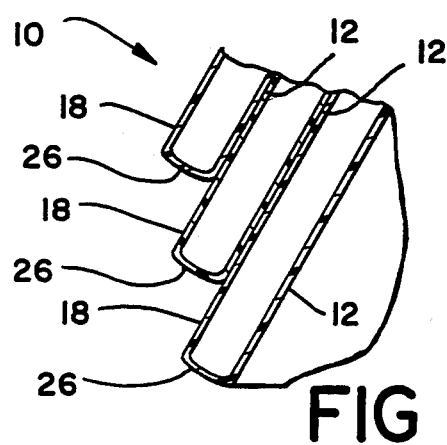
FIG _ 3
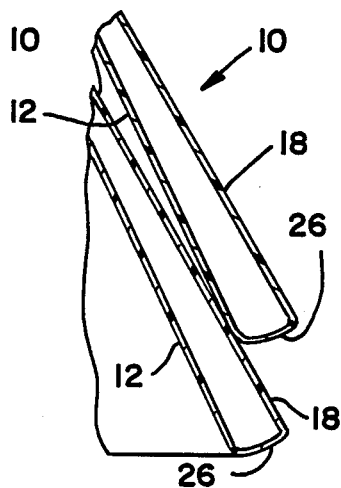
FIG _ 4

PLANT PROTECTING AND GROWTH ENHANCING DEVICE

This invention relates to a device for use in protecting plant materials from excessive cold or high temperature air and has particular application in the young stages of growth of plant materials. More particularly the invention relates to a fluid tight, conical tubular device that may be filled with fluid and placed over a plant in a field growing location.

BACKGROUND OF THE INVENTION

It is known that elongating the growing season for agricultural plant materials will provide an opportunity to increase the ultimate yield from the plant. In some agricultural areas the overall growing season is limited in the early part of the season by frost problems, whether at night or during daytime, that may destroy seedling plant materials. In those areas early planting must wait until the possibilities of frost have passed. Even in those areas that daytime temperatures are high there is still the possibility of nighttime frost, and planting must wait until nighttime frost damage can be avoided. If it were possible to plant earlier in the season and protect the plant from frost, the overall growing season can be extended with the resultant potential for increased yield from the growing plants.

It has been suggested to protect seedling plants by providing coverings for the seedling plants either as entire row covers or individual plant covers. It has also been suggested that individual plant covers may contain fluids that will release stored heat during cold periods to provide protection for the plant materials covered by the plant cover. One such individual plant protector is shown in U.S. Pat. No. 4,267,665 issued to Volney Wallace. That patent suggests a flexible, double walled thermal protective covering for plants wherein the flexible material has inner and outer tubular walls joined to provide compartments for water or the like.

A difficulty has been observed with the plant protectors of the type suggested by the Wallace patent in that those covers are flexible and are not self supporting when not containing a fluid or the like. Plant protectors of the type suggested by Wallace require the use of additional staking to support the protector whether full of fluid or empty. When those flexible containers collapse they have a tendency to smother the plant material or to become imbeded into the soil around the plant. Furthermore, the flexible covers are difficult to empty and to retreive when empty and collapsed on the ground.

SUMMARY OF THE PRESENT INVENTION

In accord with the present invention a substantially transparent, rigid walled, hollow, truncated conical plant protector is proposed that can be placed over a young plant when planting the plant to protect the plant from frost or other possible dangers until the plant is established. The hollow plant protector is adapted to contain a fluid or the like that will permit light to pass through the protector and fluid to the plant on the inside and the fluid may be selected to absorb thermal energy during exposure to sunlight or other light and to release that thermal energy when the temperature outside the plant protector is colder.

The plant protector is in a conical shape and has rigidity so that it may be stacked with other plant protectors of the same configuration; the rigidity of the plant protector permits it to be self standing around the plant and to stack well with other plant protectors.

The plant protector is adapted with a spout opening that may be used for filling and emptying fluids. In one form the spout is formed as a part of a handle that can be used to move the plant protector about.

Further objects and features of the present invention will be readily apparent to those skilled in the art to which the invention applies from the appended drawings and specification illustrating preferred embodiments wherein:

BRIEF DESCRIPTION OF THE DRAWINGS

FIG. 1 is a perspective view partially in section illustrating the plant protector in use enclosing a plant.

FIG. 2 is a partial perspective view illustrating an alternative form of fill spout and handle for the plant protector.

FIG. 3 is a partial sectional view illustrating a stack of plant protectors.

FIG. 4 is a partial sectional view illustrating an alternative form for the hollow form of the plant protector.

DETAILED DESCRIPTION OF THE INVENTION

As illustrated in FIG. 1, the plant protector 10 of the present invention comprises a first truncated, hollow, rigid, conical member 12 having a top end at 14 and a bottom end at 16, and a second truncated, rigid, conical member 18 having a top end at 20 and a bottom end at 22. The top ends 14 and 20 of the two members 12 and 18, respectfully, are joined together by a continuous closure member 24 and the bottom ends 16 and 22 of the two members 12 and 18, respectfully, are joined together by a second continuous closure member 26. When so formed and joined the plant protector 10 forms a hollow, truncated, conical tubular device.

The top closure member 24 is provided with a capable or pluggable opening at 30 through which fluids 25 or the like may be entered into the hollow interior of the plant protector or the fluids in the interior may be emptied through the opening. When so formed the plant protector provides a device that may be filled with a fluid or the like.

An alternative form for the filling and emptying opening in the plant protector is shown in FIG. 2 where a hollow spout like member 32 is attached to the opening 30 in the upper closure 24. The spout 32 as illustrated extends from the opening toward the central axis of the cone shape and is adapted with a cap or stopper 34 that contains fluids within the plant protector. The spout as illustrated is also adapted to served as a handle for use in moving the plant protector.

FIG. 3 illustrates in a partial sectional view through a stack of plant protectors the ability of the plant protectors of the present invention to be stacked on top of each other. To accomplish this stacking ability and to conserve the space that will be needed for stacked plant protectors, it is desireable to have the inside or smaller diameter of the bottom end of the first conical member smaller than the outside diameter at the top end of the second conical member and, of course, the slope of the conical shape of all plant protectors at the same angle. When so constructed and stacked, as illustrated in FIG. 2, the stacking of devices is maximized.

FIG. 4 illustrates an alternative form for the slope of the two conical members that form the assembled device. In this alternative form the slope of the conical shape of the second conical member is closer to parallel with the central axis of the cone while the slope of the first or outside conical member is the same as that illustrated in the FIG. 1 and 3 form. In this alternative form the plant protector when assembled has a wider base closure member than the closure member at the top and forms a slightly more stable protector. The alternative form for the protector still is capable of being stacked efficiently as shown in FIG. 4.

The preferred material for the formation of the plant protector is a clear, rigid plastic material that will be transparent for light and heat rays from external sources such as the Sun. Clear polyethelyene, polypropylene or vinyl will serve the purpose and will be able to withstand normal temperature ranges encountered during growing seasons. The material need not be totally transparent but it should be at least semi-transparent in that the light to the plant is needed to encourage healthy plant growth.

The plant protector is preferrably formed by blow moulding the article in one operation. A parting mould is needed to permit the article to be produced by inflating a charge of plastic material in the mould to form a double walled plant protector. The spout or handle may be formed seperately or as a part of the moulding process.

The fluid 25 contained in the plant protector may be water or another fluid or air. The other fluid may be a fluid that will capture a larger amount of thermal energy during the daylight or usually sunny hours with the ability to release that thermal energy during the dark and usually colder hours. Fluids of the desireable type are readily available as articles of commerce. Whatever material is selected for the fluid within the plant protector it is believed that the advantage of having a material that will assist the plant growth will be of greater importance than the amount of thermal energy it captures.

The plant protector may be constructed in a variety of dimensions and sizes. Some of the dimensions and sizes can be determined by the type of plant material that is to be protected. For example, a wide base and low overall height may be preferred for low growing crops while a narrow base and larger height may be preferred for rapidly growing plant materials that grow in height early in their growth.

The thickness of the material used to form the plant protector may also be variable in accord with its use. A thickness of about 1/32 of an inch or about 0.1 millimeter would be adequate to be self supporting and sturdy for field use. Thinner materials could be used in less severe applications and thicker materials may be preferred for rough field handling. The interior space between the first and second conical members is also determined by field application use but it should be evident that less than an inch or 2.5 millimeters should be preferred and about one half of that dimension should be adequate.

One advantage of the truncated form herin described is the ability of that form to permit both circulation of air as needed in photosynthesis and to permit rapidly growing plants to have upward space into which to grow. The plant protector may also provide early support for the above surface portion of the plant as the under surface roots of the plant grow to provide needed support for the plant.

The rigid conical form for the plant protector of the present invention provides an additional feature for the device in that the device may be inverted and placed over or beside a plant with the cap or plug removed from the opening in the handle or spout and the fluids within the plant protector may be drained to the plant to provide useful fluids. In that regard, the fluid 25 within the plant protector may be designed to provide nutrients and other plant protectants that can be drained onto the plant after it is established in its planted position. The fluids may drain gradually onto the plant and provide an extended feeding of the plant as the plant protector is drained.

While certain preferred embodiments of the invention have been specifically disclosed, it should be understood that the invention is not limited thereto as many variations will be readily apparent to those skilled in the art and the invention is to be given its broadest possible interpertation within the terms of the following claims.

I claim:

1. A plant protecting and growth enhancing device comprising:
   (a) a first truncated, hollow, rigid, self-supporting conical member having a top and a bottom end with said top end having a smaller diameter than said bottom end,
   (b) a second truncated, hollow, rigid, self-supporting conical member having a top and a bottom end with said top end having a smaller diameter than said bottom end,
   (c) said top end and said bottom end diameters of said second conical member being smaller that the respective diameters of said first conical member,
   (d) said first and second conical members being joined by a continuous rigid bottom closure member between said bottom ends of said first and second conical members leaving an open base for said device,
   (e) said first and second conical members being joined by a continuous rigid top closure member between said top ends of said first and second conical members leaving an open top for said device,
   (f) said first and second conical members when joined by said top and bottom closure members forming a hollow, double walled, truncated conical tubular device having an open base and open top adapted to enclose a plant and a height adapted to accomodate said plant during its growth,
   (g) and an opening formed in said top closure member,
   (h) a spout formed at said opening in said closure member, said spout including a portion extending inwardly from said top closure member toward the axis of formation of said first and second conical members, said spout being rigid and functioning as a handle for moving said device,
   (i) whereby said device when formed as above establishes an enclosed self-supporting fluid tight, conical tubular device that may be filled with a fluid at said opening in said top closure member and may be placed over a plant to provide protection and to enhance growth of said plant.

2. The device of claim 1 wherein said opening in said top closure member includes a cap to seal the interior of said hollow assembled device.

3. The device of claim 1 wherein said smaller diameter of said top and of said first conical member is smaller than said diameter of said bottom end of said second conical member whereby said hollow assembled device may be stacked axially above or below another device of the same construction and said handle portion extends within the interior of said stacked devices.

4. The device of claim 1 wherein said first and second conical members have the same slope with respect to the central axis of their conical shape.

5. The device of claim 1 wherein said first and second conical members have different slopes with the slope of said second conical member being closer to parallel to the central axis of said cone shape than the slope of said first conical member whereby said device when formed establishes a conical tubular device with a radially wider continuous closure member at said bottom end than said continuous closure member at said top end.

6. The device of claim 1 wherein said conical members are formed of an transparent material to permit light to penetrate to said plant.

* * * * *